United States Patent [19]

Evani et al.

[11] 4,029,872

[45] June 14, 1977

[54] VINYL BENZYL ETHERS AND NONIONIC WATER SOLUBLE THICKENING AGENTS PREPARED THEREFROM

[75] Inventors: Syamalarao Evani; Frederick P. Corson, both of Midland, Mich.

[73] Assignee: The Dow Chemical Company, Midland, Mich.

[22] Filed: Oct. 28, 1975

[21] Appl. No.: 626,016

Related U.S. Application Data

[62] Division of Ser. No. 489,876, July 18, 1974, Pat. No. 3,963,684, which is a division of Ser. No. 267,571, June 29, 1972.

[52] U.S. Cl. .......................... 526/303; 260/29.6 H; 260/79.7; 260/404.5; 260/407; 260/410.5; 260/561 R; 260/561 S; 260/570.7; 60/611 B; 526/304
[51] Int. Cl.² ........................................ C08F 220/56
[58] Field of Search .............. 526/303; 260/86.1 N, 260/407

[56] References Cited

UNITED STATES PATENTS

| | | | |
|---|---|---|---|
| 3,190,925 | 6/1965 | Stowe | 260/611 |
| 3,794,608 | 2/1974 | Evani et al. | 260/29.6 RW |

*Primary Examiner*—Stanford M. Levin
*Attorney, Agent, or Firm*—Albin R. Lindstrom

[57] ABSTRACT

Nonionic water soluble thickening agents are prepared by copolymerizing about 1 to 5 mole percent of a vinyl benzyl ether having the formula

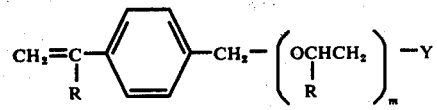

and the balance to make 100 mole percent of acrylamide.

2 Claims, No Drawings

VINYL BENZYL ETHERS AND NONIONIC WATER SOLUBLE THICKENING AGENTS PREPARED THEREFROM

CROSS-REFERENCE TO RELATED APPLICATION

This application is a division of our copending application Ser. No. 489,876, filed July 18, 1974, U.S. Pat. No. 3,963,684, which is a division of our copending application Ser. No. 267,571, filed June 29, 1972.

BACKGROUND OF THE INVENTION

This invention relates to improved nonionic water soluble thickening agents and novel vinyl benzyl ether monomers to prepare same.

SUMMARY OF THE INVENTION

Accordingly the novel vinyl benzyl ether monomers have the formula

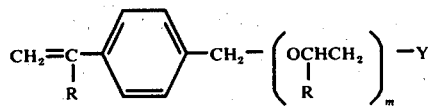

wherein R is hydrogen or methyl, $m$ is about 10 to 100 and Y is

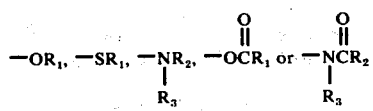

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

The nonionic water soluble thickeners are prepared by copolymerizing about 1 to 5 mole percent of said ether monomer or mixtures thereof and the balance to make 100 mole percent of acrylamide.

DESCRIPTON OF THE INVENTION

The improvements obtainable by this invention are believed to be the result of incorporating surface active groups as side groups from the copolymer chain. Copolymers prepared with the monomers described in U.S. Pat. No. 3,190,925 do not provide the improved thickening action of the copolymers described herein. Further, the vinyl benzyl ethers of this invention have and serve a totally different purpose than the monomers prepared and described in U.S. Pat. No. 3,190,925.

Vinyl benzyl ether monomers useful in this invention have the formula

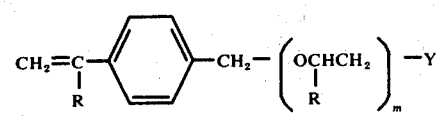

where R, $m$ and Y are as previously described. The monomers may be prepared by reacting a vinyl benzyl halide have the formula

where R is as before and X is a halide, usually Cl or Br, with a nonionic surfactant having the formula

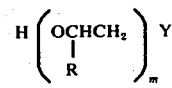

where R, $m$ and Y are as previously defined.

Generally, the nonionic surfactants are prepared by the condensation of ethylene oxide, propylene oxide or mixtures thereof with an alkyl, alkaryl, or aralkyl compound having one reactive hydrogen such as alkyl phenols having the formula

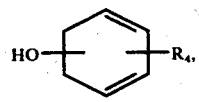

where $R_4$ is octyl, decyl, dodecyl and the like;

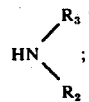

$R_1COOH$; $R_1OH$; $R_1SH$; or

where $R_1$, $R_2$ and $R_3$ are as previously defined. Typical $R_1$ groups include lauryl, myristyl, cetyl, stearyl, oleyl, linoleyl, 2-phenyldecyl, octyl phenyl, nonyl phenyl and the like. $R_2$ and $R_3$ groups include methyl, ethyl and other alkyl groups as defined for $R_1$. Alkyl phenol-ethylene oxide condensates are preferably employed. It is desirable to employ nonionic surfactants having little or no diol component to minimize formation of divinyl benzyl ethers. A variety of said nonionic surfactants and their preparation are fully disclosed in "Nonionic Surfactants," Vol. 1, edited by M. J. Schick, published by Marcel Decker, Inc. New York, 1967.

The number of oxyalkylene groups,

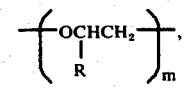

as indicated by $m$ should be at least 10 and may be quite large, up to about 100. The oxyalkylene groups may be a mixture of oxyethylene and oxypropylene groups, either heteric or block, but it is preferred that all such groups be oxyethylene groups. Preferably the number of oxyalkylene groups is about 20 to 40.

While the nonionic surfactants are well known as well as their preparation; the reaction of nonyl phenol with about 40 moles of ethylene oxide is described in the following example.

EXAMPLE 1

The starting nonylphenol was treated with 20 weight percent of toluene and the toluene removed by distillation to azetropically remove any residual water in the phenol and thereby minimize diol formation. The ethylene oxide contained less than 20 ppm of water by Karl Fischer titration.

In a 10 gallon stainless steel kettle was placed 2114 gms (9.6 moles) of anhydrous nonyl phenol and the kettle purged with nitrogen. Sodium metal (42gms, 1.82 moles) was added and the kettle purged with nitrogen again. Sodium metal was used as a catalyst in place of NaOH to avoid formation of water during the reaction. The kettle was then vented to 0 lb gauge and the contents heated at 100° C for 1 hour. Ethylene oxide was then added continuously over 6 hours with the temperature maintained at 100°–125° C. A total of 16,934 gms of ethylene oxide (380 moles or 40 moles/mole of phenol) was added and the contents of the kettle allowed to react as 125° C for 2 hours.

The product was then neutralized with $CO_2$ in the presence of 4 lbs of water which was subsequently removed by vacuum distillation using toluene to azeotropically remove the last traces of water. The product was filtered to remove sodium carbonate. The final product weighed 18,945g, was a waxy solid melting at 43°–48° C, had a percent —OH by acetic anhydride titration of 0.8175%, and had a molecular weight of 2080. For convenience the product will be designated nonyl phenol/40EO.

It is preferred in the above process to conduct the reaction at about 50° to 180° C at 5 to 150 psig oxide pressure, and more preferably at 90° to 130° C at 20–25 psig. The reaction is too slow below these limits and side reactions occur above them. The catalyst concentration generally is about 0.1 to 1% based on total weight of product. Most any inorganic acid may be used for neutralization but $CO_2$ is preferred because no over-neutralization takes place.

EXAMPLE 2

Preparation of a Vinyl Benzyl Ether of Nonyl Phenol/40EO.

Into a nitrogen purged 2-gallon stainless steel kettle was charged 1512 gms (0.727 mole) of nonyl phenol/40EO produced according to example 1, 2415 gm of t-butyl alcohol as a solvent, and 16.4 gms of sodium metal (0.715 mole). The contents were heated at 100° C for 2 hours while the pressure rose from 0 to 50 psig and leveled off. After cooling to room temperature, 107 gm of vinyl benzyl chloride (0.702 mole) was added. The kettle purged with nitrogen and the contents heated at 50°–65° C. After 3¾ hours a base titration showed 94% conversion of the vinyl benzyl chloride to the vinyl benzyl ether. The contents were then heated an additional 2 hours at 50°–55° C and neutralized to pH 6–7 with 2.85 gms of 95% acetic acid.

The alcohol solvent was removed by distillation until the kettle temperature was 80° C and the pressure 20 mm Hg. One gallon of benzene was added and then 1 quart distilled off to remove traces of alcohol. The slurry was filtered through filter cell at 175 mm Hg at 50° C to remove NaCl and sodium acetate. Remaining benzene was removed by distillation at 80° C and 20 mm Hg. The waxy solid product had a melting point of 35°–40° C and weighed 1530 gms. Bromide/bromate titration in methanol gave an equivalent weight of 2180 gm/mole of unsaturation.

t-Butyl alcohol is a preferred solvent because it results in good reaction rates and yields. The reaction of vinyl benzyl choride must be maintained below about 65° C to prevent polymerization in the strongly basic medium. Since the salts formed are partially soluble in the alcohol, it is replaced by benzene prior to filtration. The salts are undesirable in the recovered product because they are detrimental to polymerization reactions. Benzene is preferred to other hydrocarbons because it dissolves the product, doesn't dissolve the salts and is low boiling and readily removed.

EXAMPLE 3

In a manner similar to example 2 the following vinyl benzyl ether monomers were prepared. In all cases R was hydrogen and Y was -$OR_1$.

|   | $R_1$ | m | Eq. Wt. per Double Bond |
|---|---|---|---|
| A | methyl | 20 | 1865 |
| B | n-octyl | 10 | 768 |
| C | nonylphenyl | 10 | 850 |
| D | n-octyl | 40 | 2190 |
| E | n-decyl | 40 | 2225 |
| F | n-dodecyl | 40 | 2180 |
| G | nonyl phenyl | 40 | 2400 |
| H | n-octadecyl | 40 | 2560 |

The above monomers were then used to prepare various acrylamide copolymers.

EXAMPLE 4

Preparation of an Acrylamide-Vinyl Benzyl Ether Copolymer

The general procedure employed to prepare said copolymer was to dissolve the monomers in a water-isopropanol solvent (80:20 wt. ratio) to make a 10–15% monomer solution in 8 oz. citrus bottles. Ammonium persulfate (4000 ppm based on acrylamide) was added as catalyst. The bottles were flushed with nitrogen, capped and the monomers allowed to polymerize at 80° C for 16 hours. The resulting viscous polymer solutions were then used as thickeners. A homopolymer of acrylamide was prepared in the same manner for comparative test purposes.

As previously indicated, the mole percent of the vinyl benzyl ether may vary from about 1 to 5, preferably about 1 to 3, percent with the balance to make 100 mole percent of acrylamide.

The following acrylamide/VBE copolymers were prepared according to the above procedure. In each case, 15 gms of acrylamide and the appropriate amount of vinyl benzyl ether was dissolved in 135 gms of solvent.

| Polymer | Wt. of VBE*, gms | Mole Ratio AA/VBE | % Polymer in Solution |
|---|---|---|---|
| 1 | 8.02 (A) | .98/.02 | 14.6 |
| 2 | 3.3 (B) | " | 11.7 |
| 3 | 3.66 (C) | " | 12.2 |
| 4 | 9.42 (D) | " | 15.2 |
| 5 | 9.57 (E) | " | 15 |
| 6 | 9.38 (F) | " | 15.2** |
| 7 | 10.32 (G) | " | 14.3 |
| 8 | 11.0 (H) | " | 16.2** |

-continued

| Polymer | Wt. of VBE*, gms | Mole Ratio AA/VBE | % Polymer in Solution |
|---|---|---|---|
| 9 | 3.97 (A) | .99/.01 | 12.3 |
| 10 | 1.64 (B) | " | 11 |
| 11 | 1.81 (C) | " | 11.1 |
| 12 | 4.67 (D) | " | 12.7 |
| 13 | 4.74 (E) | " | 12.8 |
| 14 | 5.12 (G) | " | 13 |
| 15 | — | 1/0 | 10 |

*Letter in ( ) indicates which monomer from example 3 was used.
**Some gels formed in the polymerization which were removed by filtration.

EXAMPLE 5

The thickening ability of the various copolymers of example 4 were evaluated in a commercially available acrylic latex (Rhoplex AC-34). In the tests with polymers 1 to 8, 40 gms of latex (46% solids) was diluted with water to 50 gms and 5–6 gms of the thickener solution added. Viscosity was measured on a Brookfield Viscometer using a No. 5 spindle at 50 rpm. With polymers 9–15, 50 gms of latex was used directly without any dilution.

| Polymer | Wt. of Active Thickener | Viscosity, cps |
|---|---|---|
| 1 | 0.73 | 40 |
| 2 | 0.6 | 40 |
| 3 | 0.6 | 900 |
| 4 | 0.6 | 40 |
| 5 | 0.6 | 3,000 |
| 6 | 0.6 | 800 |
| 7 | 0.3 | 11,000 |
| 8 | 0.65 | 1,500 |
| 9 | 0.61 | 40 |
| 10 | 0.55 | 60 |
| 11 | 0.56 | 240 |
| 12 | 0.64 | 40 |
| 13 | 0.64 | 1,600 |
| 14 | 0.26 | 8,800 |
| 15 | 0.5 | 120 |

The above results show a significant increase in viscosity of the latex when the number of carbons in the $R_1$ group was increased from 8 to 10 and above. Without any thickener the viscosity of the latex was about 40 cps.

EXAMPLE 6

To 50 gms of the latex, incremental amounts of thickener solution were added and the viscosity determined as before.

| Polymer | Amt. of Active Thickener | Viscosity cps |
|---|---|---|
| 10 | 0 | 40 cps |
|  | 0.132 | 40 |
|  | 0.22 | 40 |
|  | 0.34 | 40 |
|  | 0.44 | 48 |
|  | 0.55 | 60 |
| 11 | 0.111 | 120 |
|  | 0.222 | 140 |
|  | 0.333 | 168 |
|  | 0.444 | 200 |

-continued

| Polymer | Amt. of Active Thickener | Viscosity cps |
|---|---|---|
|  | 0.555 | 240 |
| 12 | 0.127 | 40 |
|  | 0.254 | 40 |
|  | 0.317 | 40 |
|  | 0.634 | 40 |
| 13 | 0.127 | 288' |
|  | 0.254 | 560 |
|  | 0.381 | 900 |
|  | 0.508 | 1160 |
|  | 0.635 | 1600 |
| 14 | 0.065 | 520 |
|  | 0.143 | 5600 |
| 15 | 0.25 | 40 |
|  | 0.5 | 120 |

EXAMPLE 7

Following the procedure of example 2, vinyl benzyl ethers may be prepared from the following nonionic surfactants.

dodecylphenoxy (ethyleneoxy)$_{14}$ ethanol
tridecyloxy (ethyleneoxy)$_{14}$ ethanol
stearyloxy (ethyleneoxy)$_{19}$ ethanol
lauryloxy (ethyleneoxy)$_{19}$ ethanol
dodecylmercapto (ethyleneoxy)$_9$ ethanol
t-alkyl ($C_{18}$–$C_{22}$) amino (ethyleneoxy)$_{24}$ ethanol
dialkylamino (ethyleneoxy)$_{40}$ ethanol
N-methylstearamido (ethyleneoxy)$_{40}$ ethanol
N-ethyllauramido (ethyleneoxy)$_{30}$ ethanol
octadecylmercapto (ethyleneoxy)$_{60}$ ethanol
N-methyl-N-dodecylamino (ethyleneoxy)$_{40}$ ethanol
oleyloxy (ethylenoxy)$_{35}$ ethanol
hexadecylmercapto (ethyleneoxy)$_{45}$ ethanol
N,N-dioctylamino (ethylenoxy)$_{25}$ ethanol Similarly, acrylamide copolymers may be prepared with vinyl benzyl ethers prepared from the above according to example 4.

What is claimed is:
1. A nonionic water soluble binary copolymeric thickening agent composed of in polymerized form about 1 to 5 mole percent of a vinyl benzyl ether monomer and the balance to make 100 percent of acrylamide, said ether monomer having the formula

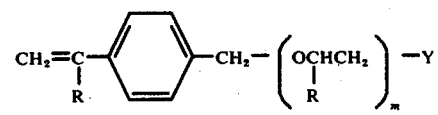

wherein R is hydrogen or methyl, m is about 10 to 100 and Y is

where $R_1$ is an alkyl, aralkyl or alkaryl hydrophobic group of 10 to about 22 carbon atoms.

2. The binary copolymeric thickening agent of claim 1 wherein the mole percent of said ether monomer is about 1 to 3 percent.

* * * * *

UNITED STATES PATENT AND TRADEMARK OFFICE
CERTIFICATE OF CORRECTION

PATENT NO. : 4,029,872
DATED : June 14, 1977
INVENTOR(S) : Syamalarao Evani & Frederick P. Corson It is certified that error appears in the above-identified patent and that said Letters Patent are hereby corrected as shown below:

Column 1, line 48, delete "DESCRIPTON" and insert --DESCRIPTION--.

Column 2, line 4, delete "have" and insert --having--.

Column 2, line 25, delete "HO$R_4$," and insert --HO$R_4$,--.

Column 3, line 25, delete "as" and insert --at--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*